United States Patent [19]

Bennett

[11] Patent Number: 5,081,680

[45] Date of Patent: Jan. 14, 1992

[54] INITIAL REPORTING OF REMOTELY GENERATED DATA

[75] Inventor: Christopher J. Bennett, San Diego, Calif.

[73] Assignee: General Instrument Corporation, New York, N.Y.

[21] Appl. No.: 434,554

[22] Filed: Nov. 8, 1989

Related U.S. Application Data

[63] Continuation of Ser. No. 123,568, Nov. 20, 1987, abandoned.

[51] Int. Cl.⁵ .............................................. H04H 9/00
[52] U.S. Cl. ........................................ 380/50; 380/10; 380/24; 358/84; 358/86; 379/92; 379/106; 455/2; 455/3; 455/5
[58] Field of Search ................... 358/84, 86; 380/10, 380/16, 49, 50, 51, 55, 59, 24; 379/106, 92; 455/2-5

[56] References Cited

U.S. PATENT DOCUMENTS

| | | | |
|---|---|---|---|
| 4,086,434 | 4/1978 | Bocchi | 379/91 |
| 4,104,486 | 8/1978 | Martin et al. | 379/106 |
| 4,115,807 | 9/1978 | Pires | 358/84 X |
| 4,163,254 | 7/1979 | Block et al. | 358/84 X |
| 4,225,884 | 9/1980 | Block et al. | 358/84 X |
| 4,258,386 | 3/1981 | Cheung | 358/84 |
| 4,290,141 | 9/1981 | Anderson et al. | 358/84 X |
| 4,361,851 | 11/1982 | Asip et al. | 358/84 |
| 4,536,791 | 8/1985 | Campbell et al. | 358/84 X |
| 4,546,382 | 10/1985 | McKenna et al. | 358/84 |
| 4,566,030 | 1/1986 | Nickerson et al. | 358/84 X |
| 4,599,644 | 7/1986 | Fischer | 358/84 |
| 4,712,238 | 12/1987 | Gilhousen et al. | 358/84 X |
| 4,893,248 | 1/1990 | Pitts et al. | 358/84 X |

FOREIGN PATENT DOCUMENTS

0013982 8/1980 European Pat. Off. .
0050451 4/1982 European Pat. Off. .

OTHER PUBLICATIONS

Webster's Ninth New Collegiate Dictionary, p. 1140, "Spontaneous", (Merriam-Webster, Springfield, Mass., 1984).

Primary Examiner—Bernarr E. Gregory
Attorney, Agent, or Firm—Edward W. Callan

[57] ABSTRACT

A device for reporting remotely stored data is coupled to a descrambler in an impulse pay-per-view television system for storing and reporting data pertaining to subject matter descrambled by the descrambler, such as identification of each impulse pay-per-view program that is descrambled. The descrambler receives scrambled television programs over a data link from a central station. The reporting device is coupled to the central station by telephone lines for reporting the stored data to the central station. The reporting device includes a memory at the remote location for storing the generated data; and a control unit for causing the stored data to be initially reported in response to the storage of at least a predetermined minimum amount of data. The control includes a clock for indicating elapsed time; and the control unit processes the elapsed time indication to define time slots within which to make the reports, with predetermined time slots for the reporting of the stored data following the storage of at least the predetermined minimum amount of data being assigned by the control means in accordance with stored predetermined criteria. The control unit monitors whether the stored data was successfully reported to the central station; and tries again to report the stored data when the stored data was not successfully reported to the central station. Upon trying again the control unit causes the stored data to be reported in a different predetermined time slot than that used for the last previous unsuccessful report.

21 Claims, 1 Drawing Sheet

INITIAL REPORTING OF REMOTELY GENERATED DATA

This is a continuation of co-pending application Ser. No. 07/123,568 filed on Nov. 20, 1987, now abandoned.

BACKGROUND OF THE INVENTION

The present invention generally pertains to reporting remotely generated data to a central station and is particularly directed to reporting program viewing data in an impulse pay-per-view subscription television system.

In prior art systems, data pertaining to predetermined subject matter is stored at remote locations and subsequently reported to a central station either periodically or in response to an interrogation signal. Typical prior art systems are described in U.S. Pat. Nos. 4,578,700 to Roberts et al., 4,584,602 to Nakagawa and 4,528,589 to Block et al. and in U.S. patent application Ser. No. 801,574 filed Nov. 26, 1985 by Kauffman, now U.S. Pat. No. 4,710,955.

SUMMARY OF THE INVENTION

The present invention provides a device coupled to a descrambler at a subscriber location for storing data pertaining to subject matter descrambled by the and for reporting said stored data to a central station, with said device comprising: memory means for storing said data; and control means for causing said stored data to be initially reported in response to the storage in the memory means of at least a predetermined minimum amount of said data. By so providing for the initial reporting of remotely stored data, it is not necessary to provide interrogation signals to prompt the stored data reports, and it is not necessary to make periodic reports when there is insufficient stored data to warrant a report. As a result the limited amount of time available for reporting data to a given central station can be utilized to receive reports from more remotely located reporting devices.

The device of the present invention may also include the following additional features.

A clock is included within the reporting device for indicating elapsed time; and the control unit processes the elapsed time indication to define a periodic time window containing a plurality of groups of recurring time slots within which to make the reports, with predetermined time slots within said groups of recurring time slots for the reporting of the stored data following the storage of at least the predetermined minimum amount of data being assigned by the control unit in accordance with stored predetermined criteria. The predetermined criteria include identification of time slots assigned to the device for reporting the stored data. The stored predetermined criteria may be changed in response to commands received by the control unit.

The control unit monitors whether the stored data is successfully reported to the central station; and tries again to report the stored data when the stored data is not successfully reported to the central station. The control unit, upon trying again, causes the stored data to be reported in a different predetermined time slot than that used for the last unsuccessful report.

The present invention also provides a system including a plurality of such reporting devices for respectively storing data generated at different remote locations and respectively reporting the stored data to a central station. Such a system may be used for reporting data from subscriber locations in a descrambling system, wherein the individual devices are coupled to descramblers at respective subscriber locations for storing data pertaining to subject matter descrambled by the respective descramblers and for reporting the stored data to a central office. In a preferred embodiment in which each descrambler is a television descrambler in an impulse pay-per-view television system, the stored and reported data identifies each impulse pay-per-view program that is descrambled.

Additional features of the present invention are described with reference to the description of the preferred embodiment.

DESCRIPTION OF THE PREFERRED EMBODIMENT

Figure 1:
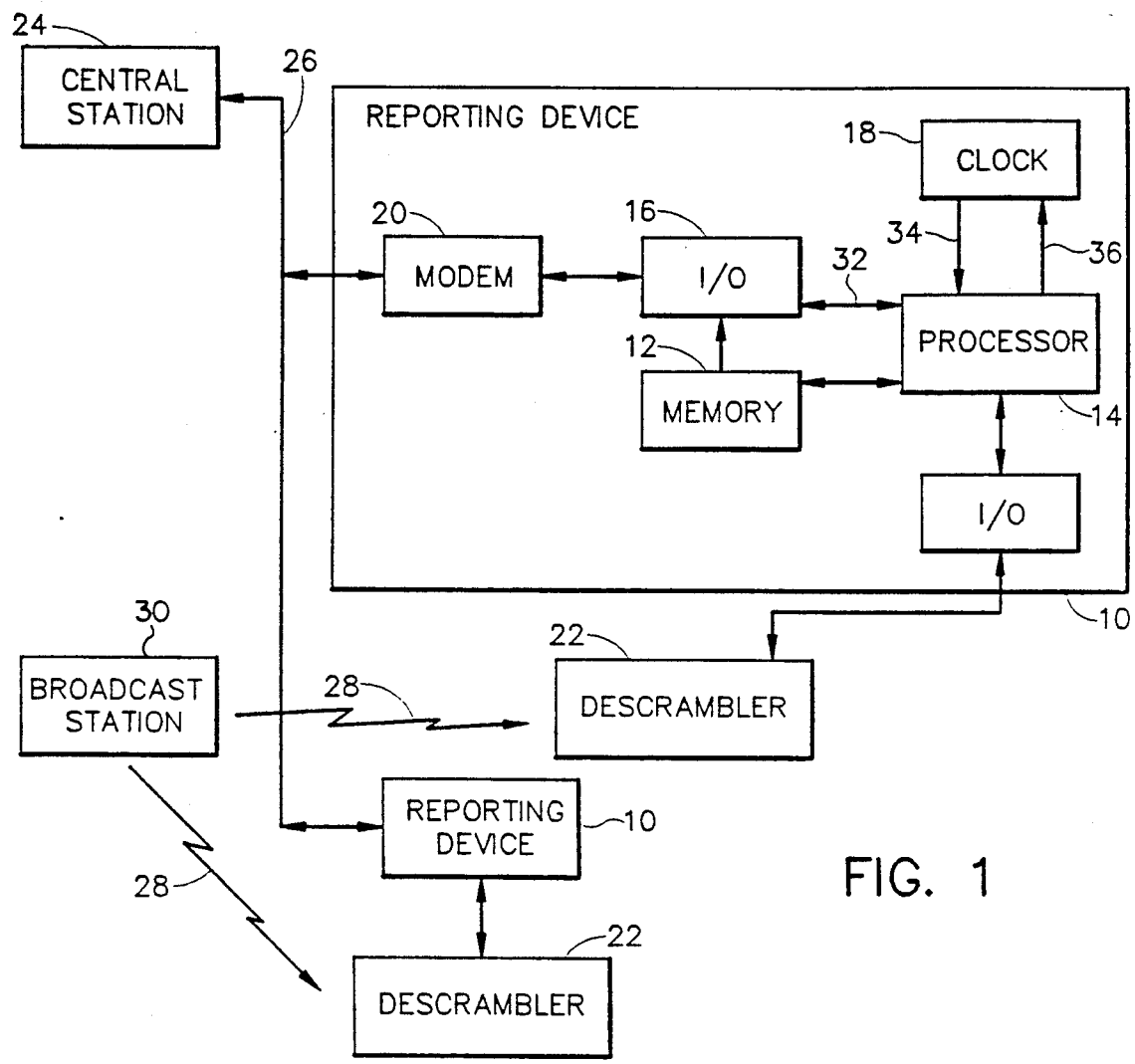
FIG. 1 is a diagram of a preferred embodiment of the present invention.

Referring to FIG. 1, a preferred embodiment of the reporting device 10 of the present invention includes a memory 12, a processor 14, an input/output (I/O) unit 16, a clock 18 and a modem 20. The functions of the aforementioned control unit are performed by the combination of the processor 14, the memory 12, the I/O unit 16 and the clock 18.

In the preferred embodiment, each of a plurality of such reporting devices 10 is coupled to a descrambler 22 in an impulse pay-per-view television system for respectively storing and reporting data pertaining to subject matter descrambled by the descramblers 22. A plurality of such reporting devices 10 are coupled to a central station 24 by telephone lines 26. The modem 20 couples the I/O unit 16 of the reporting device 10 to the telephone lines 26.

The descrambler 22 receives scrambled television programs over a data link 28 from a broadcasting station 30. The data link 28 may include an over-the-air broadcast channel and/or some hard-wired data link, such as cable. The reporting device 10 is coupled to the central station 24 by the telephone lines 26 for reporting the stored data to the central station 24.

In the preferred embodiment, the memory 12 stores data identifying each impulse pay-per-view program that is descrambled by the descrambler 22. The processor 14 maintains a count of the amount of data that has been stored in the memory 12. The processor 14 may also categorize the stored data. For example, it may group program identification data by the channels on which the program were shown.

An indication of the predetermined minimum amount of data that must be stored in the memory 12 in order to trigger a reporting of the stored data to the central station 24 also is stored in the memory 12. The predetermined minimum amount of data indication may be a predetermined count of unreported stored program identification data. After the processor 14 determines that the predetermined minimum amount of program identification data has been stored in the memory 12, the processor 14 provides a report trigger signal on line 32 to the I/O unit 16 during the next time slot assigned to the reporting device 10 for reporting stored data to the central station 24.

The I/O unit 16 responds to the trigger signal on line 32 by sending the data stored in the memory 12 over the telephone lines 26 to the central station 24. A unique identification code, such as the address of the descrambler 22 accompanies the stored data sent to the central station 24. The trigger signal on line 32 may also indicate the telephone number at the central station 24 to which the report is to be made, inasmuch as different categories of reports may be made to different programmers utilizing the central station 24. Also, different central stations 24 may receive different types of reports. Such telephone numbers are stored in the memory 12 and retrieved by the processor 14 when providing the trigger signal on line 32.

Time slots for reporting the stored data are assigned in accordance with predetermined criteria stored in the memory 12. The processor 14 defines the time slots by processing a signal on line 34 indicating elapsed time that is provided by the clock 18. The clock 18 of each reporting device 10 is synchronized with a master clock in the central station 24 by a synchronization signal on line 36 received from the central station 24 via the telephone lines 26, the modem 20, the I/O unit 16 and the processor 14. In an alternative embodiment, the synchronization signal on line 36 may be provided from the broadcast station 30 via the data link 28, the descrambler 22 and the processor 14. The synchronization signal on line 36 indicates the current time in terms of the slot count and the time in seconds remaining until the next slot boundary. Each time slot must be of sufficient duration to effect a maximum duration data report. The clock 18 is synchronized when put into operation and from time to time during operation.

The storage in the memory 12 of the telephone number(s) of the central station(s) 24, of the predetermined criteria for defining and assigning time slots in which to report the stored data, and of the indication of the predetermined minimum amount of data that must be stored before making the report may be initialized and/or changed in response to signals received by the processor 14 from the central station 24 via the telephone lines 26 or from the broadcast station 30 via the data link 28 and the descrambler 22.

Figure 2:
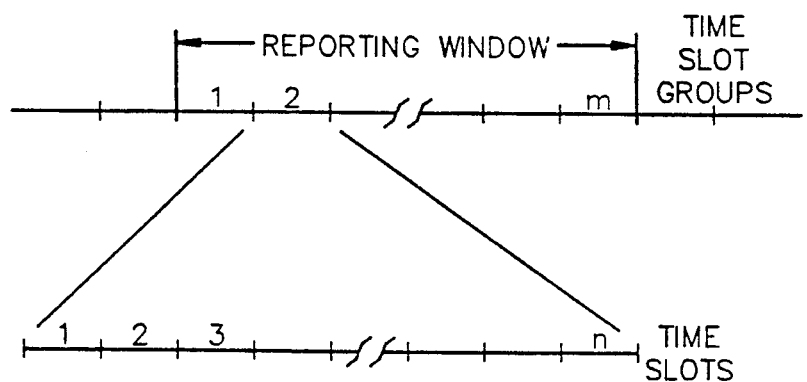
FIG. 2 illustrates the relationship between time slots, groups of time slots and a reporting window in which reports of stored data are made in accordance with the present invention.

Time slot assignment is explained with reference to FIG. 2. Initial reports are made only during a time window defined by that portion of each day, generally late at night, when telephone line usage and charges are lower. This reporting period is shown in FIG. 2 as the "reporting window". The clock 18 is reset to zero every twenty-four hours at a predetermined time so that the defined slots for the beginning and the ending of the reporting window match the current slot count every twenty-four hours. A guard band may be provided before and after the reporting window to allow for inaccuracy relative to the start and the end of the reporting window.

Different time slots for making reports within the reporting window are assigned to different reporting devices 10 in the system, with the initial reporting order for the respective reporting devices 10 being assigned in accordance with the order in which the associated descramblers 22 were authorized within the system to receive scrambled impulse pay-per-view television programs. During each reporting window there are "m" groups of time slots; and during each group of time slots there are "n" time slots. The processor 14 identifies time slots by their respective positions 1, 2, . . . , n in each recurring group. The duration of each time slot is defined by predetermined criteria stored in the memory 12.

Typically there are more reporting devices 10 in the system than there are time slots available for making reports. Accordingly, the assignment sequence wraps around, whereby a plurality of reporting devices 10 may be assigned the same initial reporting time slot within each group of time slots. Some of the time slots within each reporting window are not assigned for initial reporting attempts in order to increase the probability of time slots being available for retry reporting attempts. The initial reporting time slot assigned to the reporting device 10 is stored in the memory 12. Different time slot positions within subsequent groups of time slots are calculated in accordance with an algorithm for assignment when the initial report is not successfully received by the central station 24 and it becomes necessary for the reporting device 10 to try again to report the stored data. The algorithm is defined by predetermined criteria applicable for retry attempts.

An indication as to whether any given report is successfully received by the central station 24 is provided by the central station to the reporting device 10 over the telephone lines 26 and monitored by the processor 14. When the processor 14 determines that the data report was not successfully received, the processor 14 calculates the time slot to be used for retrying to report the data and then provides another report trigger signal on line 32 to the I/O unit 16. Upon each retry attempt, the report trigger signal on line 32 is provided during a different time slot position than was used for the last previous attempt to report the stored data. As noted above, the time slot assignment for retry attempts is calculated in accordance with an algorithm defined by predetermined criteria. The predetermined criteria applicable to retry attempts are defined by firmware in the processor 14; and the values of the parameters of such criteria are stored in the memory 12. Such predetermined criteria should ensure that each time slot has a constant probability that a given reporting device 10 will attempt to use it and achieve a uniform randomization of load on the telephone lines 26 regardless of the system configuration. In the preferred embodiment, such predetermined criteria include the following:

Each reporting device 10 in the system may make one attempt to retry reporting the stored data during each group of m time slots.

The time slot chosen for the first retry attempt is the next slot within the next group within the reporting window, whose slot count (position in the group) is equal to the least significant byte of the address of the descrambler 22 associated with the reporting device 10.

The time slot chosen for subsequent retry attempts is the next slot within the respective subsequent groups within the reporting window whose slot count is equal to the previously used slot count plus the next unused byte of the descrambler address, modulo m.

If all the bytes of the descrambler address are used, the quantity added to the last slot count is either the least significant byte of the descrambler address (if the sum of the bytes of the descrambler address is odd) or one (if the sum of the bytes of the descrambler address is even). In the latter case, the quantity added to the sum on the following attempt is the least significant byte of the descrambler address. The descrambler address is repeatedly reused in this fashion until the retry attempts are terminated.

The retry attempts are terminated when the processor 14 receives an indication on line 26 from the central station 24 that the stored data has been successfully reported to the central station 24. When the processor 14 receives such an indication of success, it records the data then stored in the memory 12 as having been reported so that any subsequent reports to the central station 24 need not include the previously reported data.

Retry attempts are terminated when a predetermined number of successive unsuccessful attempts to report the stored data have been undertaken. The number of unsuccessful attempts necessary for such termination is stored in the memory 12 and compared with the number of unsuccessful attempt indications, which is counted by the processor 14.

The processor 14 also provides a trigger signal on line 32 to cause a report of whatever data has been stored in the memory 12 in the event that no trigger signal has been generated in response to the storage of at least the predetermined minimum amount of data in the memory 12 over at least a predetermined period (a number of days) since the last report. An indication of such predetermined period also is stored in the memory 12.

The reporting device of the present invention also has other applications, such as reporting television audience survey data from sample viewers, reporting diagnostic information from external devices and reporting EFT (electronic fund transfer) data.

I claim:

1. A device for reporting data to a central station, said device comprising:
   memory means for storing data;
   control means for causing said stored data to be initially reported in response to the storage in the memory means of at least a predetermined minimum amount of said data, wherein said control means comprises:
   clock means for indicating elapsed time;
   means for processing said elapsed time indication to define time slots within which to make said reports;
   means for assigning a predetermined time slot for said reporting of said stored data following the storage in the memory means of at least said predetermined minimum amount of said data, with said time slot being assigned in accordance with predetermined criteria;
   means for storing said predetermined criteria; and
   means for changing said stored predetermined criteria.

2. A device according to claim 1, wherein the control means further comprise means for reporting said stored data at a predetermined time after the last report.

3. A device according to claim 1, wherein said processing means process said elapsed time indication to define a periodic time window containing a plurality of groups of recurring time slots within which to make reports; and
   wherein said assigning means assign said predetermined time slot within said groups of recurring time slots within said periodic time window for said reporting of said stored data.

4. A device for reporting data to a central station, said device comprising:
   memory means for storing data, and
   control means for causing said stored data to be initially reported in response to the storage in the memory means of at least a predetermined minimum amount of said data, wherein said control means comprises:
   clock means for indicating elapsed time;
   means for processing said elapsed time indication to define a recurring group of time slots within which to make said reports;
   means for assigning a predetermined time slot within said group for said reporting of said stored data following the storage in the memory means of at least said predetermined minimum amount of said data, with said time slot being assigned in accordance with predetermined criteria;
   means for monitoring whether said stored data was successfully reported to said central station; and
   means for trying again to cause said stored data to be reported, when the previous try to report said stored data to the central station was unsuccessful, wherein said means for trying again includes means for causing said stored data to be reported in a different predetermined time slot within said group than that used for the last said unsuccessful report.

5. A device according to claim 4, wherein said processing means process said elapsed time indication to define a periodic time window containing a plurality of groups of recurring time slots within which to make reports; and
   wherein said assigning means assign said predetermined time slot within said groups of recurring time slots within said time window for said reporting of said stored data.

6. A device according to claim 4, further comprising means for limiting said repeated reporting tries to a predetermined number.

7. A device according to claim 4, wherein the control means further comprise means for spontaneously reporting said stored data at a predetermined time after the last report.

8. A system including a plurality of devices for respectively reporting data generated at different locations to a central station, wherein an individual said device comprises:
   memory means for storing said data;
   control means for causing said stored data to be initially reported in response to the storage in the memory means of at least a predetermined minimum amount of said data, wherein control means comprises:
   clock means for indicating elapsed time;
   means for processing said elapsed time indication to define time slots within which to make said reports;
   means for assigning a predetermined time slot for said reporting of said stored data following the storage in the memory means of at least said predetermined minimum amount of said data, with said time slot being assigned in accordance with predetermined criteria, and with different time slots being assigned for different devices;
   means for storing said predetermined criteria; and
   means for changing said stored predetermined criteria.

9. A device according to claim 8, wherein said processing means process said elapsed time indication to define a periodic time window containing a plurality of groups of recurring time slots within which to make reports; and wherein said assigning means assign said predetermined time slot within said groups of recurring time slots within said time window for said reporting of said stored data.

10. A system according to claim 8, wherein the control means further comprise means for reporting said stored data at a predetermined time after the last report.

11. A system according to claim 8, coupled to a descrambler at a subscriber location for storing data pertaining to subject matter descrambled by said descrambler and for reporting said stored data to said central office.

12. A system according to claim 11, wherein said descrambler is a television descrambler in an impulse pay-per-view television system, and said memory means store data identifying each impulse pay-per-view program that is descrambled.

13. A system including a plurality of devices for respectively reporting data generated at different locations to a central station, wherein an individual said device comprises:

memory means for storing said data; and control means for causing said stored data to be initially reported in response to the storage in the memory means of at least a predetermined minimum amount of said data, wherein control means comprises:

clock means for indicating elapsed time;

means for processing said elapsed time indication to define a recurring group of time slots within which to make said reports, wherein the number of time slots in the group is less than the number of said devices in the system; and means for assigning a predetermined time slot within said group for said reporting of said stored data following the storage in the memory means of at least said predetermined minimum amount of said data, with said time slot being assigned in accordance with predetermined criteria, and with different time slots being assigned for different devices, but with some time slots being assigned to more than one said device;

means for monitoring whether said stored data was successfully reported to said central station; and means for trying again to cause said stored data to be reported, when the previous try to report said stored data to the central station was unsuccessful, wherein said means for trying again includes means for causing said stored data to be reported in a different predetermined time slot within said group than that used for the last said unsuccessful report.

14. A device according to claim 13, wherein said processing means process said elapsed time indication to define a periodic time window containing a plurality of groups of recurring time slots within which to make reports; and wherein said assigning means assign said predetermined time slot within said groups of recurring time slots within said time window for said reporting of said stored data.

15. A system according to claim 13 for reporting data from subscriber locations in a descrambling system, wherein said individual device is coupled to a descrambler at a respective subscriber location for storing data pertaining to subject matter descrambled by said descrambler and for reporting said stored data to a central office.

16. A system according to claim 15, wherein said descrambler is a television descrambler in an impulse pay-per-view television system, and said memory means store data identifying each impulse pay-per-view program that is descrambled.

17. A system according to claim 13, further comprising means for limiting said repeated reporting tries to a predetermined number.

18. A system according to claim 13, wherein the control means further comprise means for spontaneously reporting said stored data a predetermined time after the last report.

19. A device for reporting data to a central station, said device, comprising:

memory means for storing data; and control means for causing said stored data to be initially reported in response to the storage in the memory means of at least a predetermined minimum amount of said data, wherein the control means comprise means for storing an indication of a predetermined minimum count of the amount of unreported data that must be stored in the memory means in order to trigger said reporting of said stored data;

means for maintaining a count of the amount of unreported data stored in the memory means; and means for triggering said report upon determining that the maintained count of unreported data stored in the memory means reaches said stored predetermined minimum count.

20. A device according to claim 19, coupled to a descrambler at a subscriber location for storing data pertaining to subject matter descrambled by said descrambler and for reporting said stored data to said central office.

21. A device according to claim 20, wherein said descrambler is a television descrambler in an impulse pay-per-view television system, and said memory means store data identifying each impulse pay-per-view program that is descrambled.

* * * * *